(12) United States Patent
Scola et al.

(10) Patent No.: US 6,515,040 B1
(45) Date of Patent: Feb. 4, 2003

(54) MICROWAVE SYNTHESIS OF POLYAMIDES, POLYESTERS, AND POLYAMIDEESTERS

(75) Inventors: Daniel A. Scola, Glasonbury, CT (US); Xiaomei Fang, Duluth, GA (US); Samuel Huang, Bloomfield, CT (US); Eleonora Vaccaro, Santa Barbara, CA (US)

(73) Assignee: The University of Connecticut, Storrs, CT (US)

( * ) Notice: Subject to any disclaimer, the term of this patent is extended or adjusted under 35 U.S.C. 154(b) by 233 days.

(21) Appl. No.: 09/641,422

(22) Filed: Aug. 17, 2000

Related U.S. Application Data

(60) Provisional application No. 60/149,982, filed on Aug. 20, 1999.

(51) Int. Cl.[7] .............................. B29C 35/08; C08J 3/28; C08G 69/02; C08G 69/44
(52) U.S. Cl. ...................... 522/167; 522/168; 522/173; 522/176; 522/179; 522/1; 264/489; 264/490; 264/496
(58) Field of Search ........................... 522/1, 167, 168, 522/173, 176, 179; 264/496, 489, 490; 427/508, 510, 513, 520, 521

(56) References Cited

U.S. PATENT DOCUMENTS

| | | | | |
|---|---|---|---|---|
| 4,696,981 A | * | 9/1987 | Harada et al. ............... | 522/173 |
| 5,317,081 A | | 5/1994 | Gelorme et al. ............. | 528/353 |
| 5,321,222 A | | 6/1994 | Bible et al. .................. | 219/745 |
| 5,453,161 A | * | 9/1995 | DeMeuse et al. ...... | 204/157.71 |
| 5,521,360 A | | 5/1996 | Johnson et al. ............. | 219/709 |
| 5,648,038 A | | 7/1997 | Fathi et al. ................. | 264/406 |
| 5,961,871 A | | 10/1999 | Bible et al. .................. | 219/709 |
| 6,316,518 B1 | * | 11/2001 | Phipps et al. ............... | 522/104 |
| 6,368,994 B1 | * | 4/2002 | Sklyarevich .................. | 522/1 |

FOREIGN PATENT DOCUMENTS

GB      1534151      11/1978

OTHER PUBLICATIONS

P. Albert, H. Warth, R. Muelhaupt, and R. Janda, Macromol. Chem. Phys., vol. 197, No. 5, pp. 1633–1640 (1996); "Comparison of thermal and microwaveactivated polymerization of epsilon–caprolactone with titanium tetrabutylate as catalyst".

F. Pardoi, Chim. Ind. (Milan), vol. 80, No. 1, pp. 55–61 (1998); "Microwave heating: polymerization processes and organic syntheses".

* cited by examiner

*Primary Examiner*—Susan W. Berman
(74) *Attorney, Agent, or Firm*—Cantor Colburn LLP

(57) ABSTRACT

Polyamides, polyesters, and polyamideesters are efficiently synthesized in a microwave process with precise temperature control. Compared to conventional thermal polymerizations, the microwave process takes less time and produces polymers with equivalent or superior physical properties.

32 Claims, No Drawings

MICROWAVE SYNTHESIS OF POLYAMIDES, POLYESTERS, AND POLYAMIDEESTERS

CROSS REFERENCE TO RELATED APPLICATIONS

This application claims the benefit of U.S. Provisional Application Serial No. 60/149,982, filed Aug. 20, 1999.

BACKGROUND OF THE INVENTION

This invention relates generally to methods of polymerization and the polymers formed thereby. In particular, this invention relates to methods using pulsed microwave polymerization for the synthesis of polymers such as polyamides, polyesters, and polyamideesters.

Despite extensive research and development directed to methods for the manufacture of polymers, there are still areas where improvement would result in significant economic benefit. Examples include shortening the time required for polymerization, and maximizing the efficiency of the energy input required for polymerization. There is also a continuing need for improved methods for the manufacture of three-dimensional molded parts having fine-scale features, especially those having close tolerances.

One approach to reducing times and input energies required for polymerization reactions is to employ microwave radiation as a heat source. As an alternative to conventional heating techniques, microwave irradiation provides an effective, selective, and fast synthetic method by heating the molecules directly through the interaction between the microwave energy and the molecular dipole moments of the starting materials. Microwave radiation has been employed in polymer synthesis and curing; see, for example, F. Parodi, *Chim. Ind. (Milan)*, volume 80, number 1, pages 55–61 (1998); and U.S. Pat. No. 5,317,081 to Gelorme et al. A publication by Albert et al. describes microwave-activated polymerization of epsilon-caprolactone with titanium tetrabutylate catalyst, but this process appears to offer no advantages in reaction times or product molecular weights compared to the corresponding thermal synthesis; see P. Albert, H. Warth, R. Muelhaupt, and R. Janda, *Macromol. Chem. Phys.*, volume 197, number 5, pages 1633–1640 (1996). In Great Britain Patent No. 1,534,151, Dolden et al. describe a microwave process for synthesis of polyamides from amino acids, lactams, or mixtures of organic diacids and organic diamines. While the method of Dolden et al. appears to enable reduced reaction times, it does not allow precise control of reaction temperature, and does not produce high molecular weight polymers in high yield. There accordingly remains a need for an efficient and highly reproducible process for microwave synthesis of polyamides, polyesters, and polyamideesters.

BRIEF SUMMARY OF THE INVENTION

A time-saving and reproducible polymer synthesis is provided by a method, comprising:

irradiating a reaction mixture with microwaves, wherein the microwave radiation is characterized by
- a varying frequency of about 2.4 to about 7 GHz;
- a frequency sweep rate of about 0.1 to about 10 GHz/sec;
- a forward power input of about 200 to about 10,000 Watts per total moles of reactant; and
- the forward power input of the microwave radiation is adjusted to maintain a known temperature in the composition; and further wherein the reaction mixture comprises aliphatic lactones having from 4 to 12 carbon atoms; aliphatic lactams having from 4 to 12 carbon atoms; amino acids having from 4 to 12 carbon atoms; omega-hydroxyacids having from 4 to 12 carbon atoms; mixtures of aliphatic dicarboxylic acids having from 4 to 12 carbon atoms and aliphatic diamines having from 2 to 12 carbon atoms; mixtures of aliphatic dicarboxylic acids having from 4 to 12 carbon atoms and aliphatic diols having from 2 to 12 carbon atoms; or mixtures of aliphatic lactones having from 4 to 12 carbon atoms and aliphatic lactams having from 4 to 12 carbon atoms.

Use of microwave frequency sweeping and temperature control via microwave forward power setting and on/off forward power control enables synthesis of polymer having higher molecular weights and lower dispersities compared to polymers prepared by previously known methods.

The method enables substantial time savings compared to conventional thermal polymerizations. The method also enables solvent-free polymerizations and is suitable for directly producing molded articles by polymerizing monomer mixtures in article-shaped molds.

DETAILED DESCRIPTION OF THE PREFERRED EMBODIMENTS

A method for synthesizing polyamides, polyester, and polyamideesters comprises:

irradiating a reaction mixture with microwaves, wherein the microwave radiation is characterized by
- a varying frequency of about 2.4 to about 7 GHz;
- a frequency sweep rate of about 0.1 to about 10 GHz/sec;
- a forward power input of about 200 to about 10,000 Watts per total moles of reactant; and
- the forward power input of the microwave radiation is adjusted to maintain a known temperature in the composition; and further wherein the reaction mixture comprises aliphatic lactones having from 4 to 12 carbon atoms; aliphatic lactams having from 4 to 12 carbon atoms; amino acids having from 4 to 12 carbon atoms; omega-hydroxyacids having from 4 to 12 carbon atoms; mixtures of aliphatic dicarboxylic acids having from 4 to 12 carbon atoms and aliphatic diamines having from 2 to 12 carbon atoms; mixtures of aliphatic dicarboxylic acids having from 4 to 12 carbon atoms and aliphatic diols having from 2 to 12 carbon atoms; or mixtures of aliphatic lactones having from 4 to 12 carbon atoms and aliphatic lactams having from 4 to 12 carbon atoms.

The method is suitable for the synthesis of polyesters from lactones. Suitable lactones include aliphatic lactones having from 4 to 12 carbon atoms, preferably from 5 to 10 carbon atoms. Preferred lactones may be represented by the formula

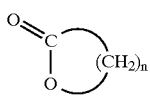

wherein n=3–11. A highly preferred lactone is epsilon-caprolactone (n=5).

The method is also suitable for the synthesis of polyesters from omega-hydroxycarboxylic acids having from 4 to 12 carbon atoms. Preferred omega-hydroxycarboxylic acids are represented by the formula

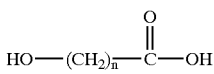

wherein n=3–11. A highly preferred hydroxycarboxylic acid is epsilon-hydroxycaproic acid (n-5)

The method is suitable for the synthesis of polyesters from mixtures comprising aliphatic dicarboxylic acids having 4–12 carbon atoms and aliphatic diols having 2–12 carbon atoms. Preferred aliphatic dicarboxylic acids are represented by the formula

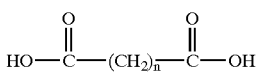

wherein n=2–10. A highly preferred aliphatic dicarboxylic acid is adipic acid (n=4). Preferred aliphatic diols are represented by the formula

wherein n=2–12. Highly preferred organic diols include ethylene glycol and 1,4-butanediol. It is preferred that the molar ratio of the dicarboxylic acid to the diol be about 0.8:1.2 to about 1.2:0.8, more preferably about 0.9:1.1 to about 1.1:0.9, yet more preferably about 0.98:1.02 to about 1.02:0.98.

The method is suitable for the synthesis of polyamides from organic lactams having from 4 to 12 carbon atoms. Preferred lactams are represented by the formula

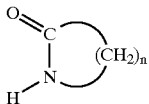

wherein n=3–11. A highly preferred lactam is epsilon-caprolactam (n=5).

The method is suitable for the synthesis of polyamides from amino acids having from 4 to 12 carbon atoms. Preferred amino acids are represented by the formula

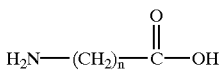

wherein n=3–11. A highly preferred amino acid is epsilon-aminocaproic acid (n=5).

The method is suitable for the synthesis of polyamides from aliphatic dicarboxylic acids having from 4 to 12 carbon atoms and aliphatic diamines having from 2 to 12 carbon atoms. Suitable and preferred aliphatic dicarboxylic acids are the same as those described above for the synthesis of polyesters. Preferred aliphatic diamines are represented by the formula

wherein n=2–12. A highly preferred aliphatic diamine is hexamethylenediamine ($H_2N(CH_2)_6NH_2$). It is preferred that the molar ratio of the dicarboxylic acid to the diamine be about 0.8:1.2 to about 1.2:0.8, more preferably about 0.9:1.1 to about 1.1:0.9, yet more preferably about 0.98:1.02 to about 1.02:0.98.

The method is also suitable for the synthesis of polyamideesters from aliphatic lactones having from 4 to 12 carbon atoms and aliphatic lactams having from 4 to 12 carbon atoms. The aliphatic lactones are the same as those described above for polyester synthesis, and the aliphatic lactams are the same as those described above for the synthesis of polyamides. The ratio of aliphatic lactone to aliphatic lactam may vary widely depending on the desired composition of the final copolymer, as well as the relative reactivity of the lactone and the lactam. One advantage of the present method over conventional thermal copolymerizations of lactams and lactones is that the ratio of ester to amide units in the final copolymer may closely approximate the initial molar ratio of lactone to lactam. The present method therefore reduces waste and simplifies isolation procedures. A presently preferred initial molar ratio of aliphatic lactam to aliphatic lactone is about 0.5:1 to about 4.0:1, more preferably about 1:1 to about 2:1.

The composition may further comprise a catalyst or an initiator. Generally, any known catalyst or initiator suitable for the corresponding thermal polymerization may be used. Alternatively, the polymerization may be conducted without a catalyst or initiator. For example, in the synthesis of polyamides from aliphatic dicarboxylic acids and aliphatic diamines, no catalyst is required.

For the synthesis of polyamides from lactams, suitable catalysts include water and the omega-amino acids corresponding to the ring-opened (hydrolyzed) lactam used in the synthesis. Other suitable catalysts include metallic aluminum alkylates ($MAl(OR)_3H$; wherein M is an alkali metal or alkaline earth metal, and R is $C_1-C_{12}$ alkyl), sodium dihydrobis(2-methoxyethoxy)aluminate, lithium dihydrobis(tert-butoxy)aluminate, aluminum alkylates ($Al(OR)_2R$; wherein R is $C_1-C_{12}$ alkyl), N-sodium caprolactam, magnesium chloride or bromide salt of epsilon-caprolactam ($MgXC_6H_{10}NO$, X=Br or Cl), dialkoxy aluminum hydride. Suitable initiators include isophthaloybiscaprolactam, N-acetalcaprolactam, isocyanate epsilon-caprolactam adducts, alcohols (ROH; wherein R is $C_1-C_{12}$ alkyl), diols (HO—R—OH; wherein R is R is $C_1-C_{12}$ alkylene), omega-aminocaproic acids, and sodium methoxide.

For the synthesis of polyesters from lactones, suitable catalysts include tin(II) compounds, such as stannous octoate (tin(II)2-ethylhexoate, C.A.S. Registry No. 301-10-0); and metal alkoxides such as alkoxides of Al, Zn, Y, Ti, and rare earth metals, wherein each alkoxide group has from 1 to 12 carbon atoms. Suitable initiators include aliphatic diols having from 2 to 12 carbon atoms, such as 1,4-butanediol.

For the synthesis of polyamideesters from lactones and lactams, suitable catalysts include metal hydride compounds, such as a lithium aluminum hydride catalysts having the formula $LiAl(H)_x(R^1)_y$, where x=1–4, y=0–3, x+y=4, and $R^1$ is selected from the group consisting of $C_1-C_{12}$ alkyl and $C_1-C_{12}$ alkoxy; highly preferred catalysts include $LiAl(H)(OR^2)_3$, wherein $R^2$ is selected from the group consisting of $C_1-C_8$ alkyl; an especially preferred catalyst is $LiAl(H)(OC(CH_3)_3)_3$. Other suitable catalysts and initiators include those described above for the polymerization of poly(epsilon-caprolactam) and poly(epsilon-caprolactone).

While the reaction can be conducted in the presence of air, it is generally preferred to exclude oxygen from the composition, as polymer products may oxidize and darken at the polymerization temperature in the presence of oxygen. Any known means of excluding oxygen may be employed, including flushing the system with an inert gas such as nitrogen or argon. While suitable results are demonstrated below for polymerization at atmospheric pressure, there is no particular limitation on the pressure during polymerization.

A microwave furnace suitable for the irradiating the composition comprises a microwave source, microwave frequency range selector, a microwave frequency modulator to modulate the microwave frequency across the selected frequency range, microwave forward power controller to select the forward power setting, a thermocouple or other temperature measuring means, and a microwave forward power on/off controller to turn the forward power on and off in response to the temperature of the composition. Frequency modulation increases the uniformity of the power distribution throughout the furnace cavity, thereby heating the composition uniformly. Suitable microwave furnaces are described in, for example, U.S. Pat. Nos. 5,321,222 and 5,961,871 to Bible et al., U.S. Pat. No. 5,648,038 to Fathi et al., and U.S. Pat. No. 5,521,360 to Johnson et al. A presently preferred microwave furnace is commercially available from Lambda Technologies, Inc., as model no. LT 502 Xb.

The selection of the actual microwave frequency range will depend on the reactants, but will generally be about 2.4 to about 7 GHz. The microwave frequency sweep range is generally about 0.1 to about 10 GHz/sec, with about 0.2 to about 5 GHz/sec being preferred and about 0.5 to about 1 GHz/sec being more preferred. A suitable forward power input is about 200 to about 10,000 Watts per total moles of reactant, preferably about 300 to about 6,000 Watts per total moles of reactant, more preferably about 300 to about 1500 Watts per total moles of reactant. Selection of a forward power input will depend on the nature of the reactants. For example, in the synthesis of nylon-6,6 from adipic acid and 1,6-diaminohexane, a preferred forward power level is about 1200 to about 4000 Watts, more preferably about 2000 to about 3500 Watts. In the synthesis of poly(caprolactone) from epsilon-caprolactone, a preferred forward power is about 500 to about 2500 Watts, more preferably about 900 to about 1500 Watts. In the synthesis of nylon-6 from epsilon-caprolactam, a preferred forward power is about 500 to about 3000 Watts, more preferably about 900 to about 2800 Watts. In the synthesis of poly(caprolactone-co-caprolactam) from mixtures of epsilon-caprolactone and epsilon-caprolactam, a preferred forward power is about 250 to about 1500 Watts, more preferably about 400 to about 1200 Watts.

It is preferred that the reaction mixture be irradiated in a vessel transparent to microwave radiation in the frequency range employed. Vessels comprising poly(tetrafluoroethylene) are presently preferred.

The method may additionally comprise a purification step to remove residual reactant and low molecular weight polymer. Purification can be accomplished, for example, by dissolving the crude polymer product in a solvent to form a solution and precipitating the purified product by addition of an anti-solvent to the solution. Alternatively, the purification may be accomplished by a solvent extraction of the crude polymer. In yet another alternative, purification may be accomplished by chromatographic separation of the high molecular weight polymer by, for example, size exclusion chromatography. All of the above methods are effective to remove residual reactant and low molecular weight polymer from the crude polymer. Such purification methods are known to those of ordinary skill in the art and details of their use may be determined without undue experimentation.

The method may additionally comprise a drying step. When applied to a crude reaction product, the drying step may remove residual reactant. When applied to a material derived from a purification step, as the extraction and crystallization methods described above, the drying step may remove residual solvents. Drying can be accomplished using one or more of elevated temperatures (preferably below the melting point of the polymer), reduced pressures, and atmosphere exchange.

The method is suitable for direct molding of shaped articles by filling a mold with a reaction mixture and irradiating the reaction mixture to form the plastic part. In this embodiment, lactones and lactams are preferred reactants because their polymerization produces no side products. This approach greatly simplifies and speeds up the production of molded parts.

The invention is further illustrated by the following non-limiting examples.

EXAMPLES 1–5

This example describes the microwave synthesis of Nylon-6,6 from 1,6-hexamethylenediamine and adipic acid. All syntheses employed a model number LT 502 Xb microwave furnace obtained from Lambda Technologies. To prepare the Example 1 formulation, a sealed poly(tetrafluoroethylene) (TEFLON®) reaction vessel was charged with an intimate mixture of 1,6-hexamethylenediamine (Aldrich, used as received; 3.3 g) and adipic acid (Aldrich, used as received; 2.6 g) and flushed with nitrogen. Maintaining a nitrogen atmosphere, the mixture was heated to 180° C. for 30 minutes at a frequency range of 4.2 to 5.2 GHz, a frequency sweep rate of 1.0 GHz/sec, and a forward power of 100–150 Watts. The temperature was controlled with a grounded Omega K type thermocouple, which had been calibrated by a Luxtron optical fiber temperature probe. The product was isolated by extraction with refluxing methanol and analyzed by differential scanning calorimetry (DSC) to determine the glass transition temperature, $T_g$, the peak melting temperature, $T_m$(peak), and the onset melting temperature, $T_m$(onset), using a TA Instrument 2100 Thermal Analysis DSC 2950 at a heating range of 20° C./minutes under nitrogen atmosphere. Formulations for Examples 2–4 were prepared similarly, except that the reaction temperature and time were varied, and in the case of Example 5, the product was exposed to vacuum (about 30 mm Hg) at 280° C. for about 16 hours to remove residual volatiles. Results are listed in Table 1, which also give comparative results for a commer cially prepared nylon-6,6, obtained under the trade name ZYTEL® 101 from Du Pont. Example 2 is a replicate of Example 1, and Example 4 is a replicate of Example 3. The product of Example 5, which was vacuum treated, exhibits glass transition and melting temperatures very close to those of the commercial product.

TABLE 1

| | Example No. | | | | | |
|---|---|---|---|---|---|---|
| | 1 | 2 | 3 | 4 | 5 | A* |
| Reaction temp. (° C.), time (min) | 180° C. for 30 min | 180° C. for 30 min | 100° C. for 10 min plus 210° C. for 30 min | 100° C. for 10 min plus 210° C. for 30 min | 100° C. for 10 min plus 210° C. for 30 min | — |
| $T_g$ (° C.) | 50 | 50 | 50 | ca. 100 | 50 | 50 |
| $T_m$ (peak)(° C.) | 241.26 | 254.77 | 256.50 | 251.60 | 261.04 | 261.83 |
| $T_m$ (onset) (° C.) | 228.11 | 243.33 | 248.21 | 243.10 | 254.87 | 249.14 |

*Comparative; ZYTEL® 101 for 2 hours. No reaction was observed after two hours at a temperature of 120° C. The microwave frequency was varied over a range of 4.19 to 5.19 GHz. Crude products were dissolved in chloroform and precipitated from hexane. Glass transition temperatures and peak melting points were determined by DSC, as above. Number average molecular weight and polydispersity (i.e., the ratio of weight average molecular weight to number average molecular weight) were determined by gel permeation chromatography (GPC) using a Millipore model 150-C chromatography system with a solvent system of 0.05 M LiBr in N-methylpyrolidone. Tensile moduli and strengths were measured in an Instron 1011 according to ASTM 638 with a crosshead rate of 20 mm/min. The dumbbell-like samples had a nominal size of about 20 mm×4.8 mm×0.5 mm. Five samples were tested for each material. Results are presented in Table 2. Comparative results from the literature are also presented for a sample prepared by thermal heating; see S. Dumitriu, *Polymeric Biomaterials*, Marcel Dekker, Inc., 1994, page 403. The highest molecular weight and lowest polydispersity were obtained at the 150° C. reaction temperature.

TABLE 2

| | Example No. | | | | | | |
|---|---|---|---|---|---|---|---|
| | 6 | 7 | 8 | 9 | 10 | 11 | B* |
| Butanediol added? | yes | yes | yes | no | no | no | — |
| Reaction temp. (° C.) | 150 | 180 | 200 | 150 | 180 | 200 | — |
| $T_g$ (° C.) | −62.5 | −60.9 | −62.5 | −60.4 | −58.7 | −60.4 | −62 |
| $T_m$ (peak) (° C.) | 57.2 | 56.7 | 56.9 | 58.9 | 60.4 | 59.2 | 57 |
| $M_w$ (g/mol) | 11,000 | 9,900 | 10,800 | 86,300 | 78,700 | 50,700 | 44,00 |
| Polydispersity | 1.7 | 1.8 | 1.9 | 2.5 | 2.6 | 2.3 | — |
| Yield strength (Mpa) | — | — | — | 17.3 ± 0.8 | — | — | — |
| Yield strain (%) | — | — | — | 9.9 ± 1.5 | — | — | 7.0 |
| Tensile modulus (Mpa) | — | — | — | 406 ± 27 | — | — | 400 |
| Tensile strength (Mpa) | — | — | — | 21.8 ± 2.5 | — | — | 16 |
| Strain at break (%) | — | — | — | 514 ± 77 | — | — | 80 |

*comparative (thermal preparation)

EXAMPLES 6–8

Using the microwave furnace of Examples 1–5, polycaprolactone was synthesized by ring-opening polymerization of epsilon-caprolactone. For each example, an intimate admixture of epsilon-caprolactone (Aldrich Chemical Co., used as received, 5–10 g), 1,4-butanediol (Aldrich Chemical Co., used as received, 0 or 1 mole %), and stannous octoate (Pfaltz & Bauer, used as received, 0.05 mole %), was added to the sealed TEFLON® reactor, and the system was flushed with nitrogen. The nitrogen atmosphere was maintained throughout the reaction. The examples varied in their reaction temperature (see Table 2), but in all cases a low forward power (70–100 Watts) was applied to maintain a temperature

EXAMPLES 12–15

Using the microwave furnace of Example 1, nylon-6 was synthesized from epsilon-caprolactam. Reaction times and temperatures were varied as indicated in Table 3. No reaction was observed when a temperature of 220° C. was used for up to three hours. The microwave frequency was varied over a range of 4.19 to 5.19 GHz, and a forward power of 90–135 W was used. The TEFLON® reaction vessel was charged with epsilon-caprolactam (obtained from Aldrich Chemical Co. and recrystallized three times from acetone and dried in vacuum before use, 5–10 g) and omega-aminocaproic acid (obtained from Aldrich Chemical Co., used as received, 10 mol %), and flushed with nitrogen. Crude products were extracted by hot methanol for over 16 hours, then dried in vacuum at 90° C. overnight. Product yields (after purification), glass transition temperatures, peak melting temperatures, molecular weights, colors, and tensile properties are presented in Table 3. For comparative purposes, results are also presented for the commercially available nylon-6 sold as CAPRON® 8202NL by Allied Signal. A comparison of tensile properties for the microwave sample synthesized for 2 hours at 250° C. and the commercial sample shows that the ultimate tensile strength is similar for the two materials. However, notwithstanding similar molecular weights for the two samples, the strain to failure for the microwave synthesized sample was approximately ⅕ that of the commercial sample. This greater brittleness exhibited by the microwave synthesized sample may be related to its higher crystallinity. Differential scanning calorimetry (DSC) indicated that 36% crystallinity for the microwave samples versus 31% for the commercial sample, based on exothermic peaks for polymer crystallization during cooling.

TABLE 3

| | Example No. | | | | |
|---|---|---|---|---|---|
| | 12 | 13 | 14 | 15 | C* |
| Reaction temp., time | 250° C., 1 hour | 250° C., 2 hours | 250° C., 3 hours | 280° C., 2 hours | — |
| Yield (%) | 79.1 | 84.1 | 86.5 | 81.6 | — |
| $T_g$ (° C.) | 53.6 | 53.2 | 53.1 | 53.7 | 56.8 |
| $T_m$ (peak) (° C.) | 221.5 | 221.6 | 221.3 | 221.7 | 227.4 |
| $M_n$ (g/mol) | 19,300 | 24,200 | 26,800 | 15,500 | 25,000 |
| Color | white | white | very slightly brown | light brown | white |
| Yield strength (Mpa) | — | 52.7 ± 5.1 | — | — | 55.2 ± 8.6 |
| Yield strain (%) | — | 5.7 ± 1.1 | — | — | 29.6 ± 5.4 |
| Tensile modulus (Mpa) | — | 320 ± 70 | — | — | 42 ± 20 |
| Tensile strength (Mpa) | — | 66.9 ± 5.9 | — | — | 61.1 ± 7.1 |
| Strain at break (%) | — | 21 ± 8 | — | — | 144 ± 45 |

*comparative (CAPRON ® 8202NL)

EXAMPLES 16–19

Using the microwave furnace of Example 1, polyamideesters were synthesized from epsilon-caprolactone and epsilon-caprolactam under varying conditions of reaction temperature and time. All compositions contained 5–10 g of a 1:2 molar ratio of caprolactone to caprolactam, and 1 mole % of the catalyst $LiAl(H)(OC(CH_3)_3)_3$. Relatively uniform heating was achieved by applying variable frequencies from 4.19 to 5.19 GHz at a sweep rate of 1.0 GHz/sec and a forward power of 40–50 W. The selection of this frequency range was based on the molecular relaxation frequencies of epsilon-caprolactone and epsilon-caprolactam as determined by the present inventors and reported in X. Fang, R. Hutcheon, and D. A. Scola, *J Polym. Sci*, volume 38, number 8, pages 1379–1390 (2000). The ratio of ester groups to amide groups in the product was estimated by taking the ratio of the $^1$H NMR intensities for the corresponding methylene groups for a sample of polymer dissolved in deuterated trifluoroacetic acid; $^1$H NMR spectra were collected on a Bruker DMX500 NMR spectrometer. Glass transition temperatures were measured with Dynamic Mechanical Thermal Analysis using a Polymer Laboratories DMTA Mk II instrument and a 0.5 mm thick film of each sample; the measurements were conducted in a single-bending mode from −80 to 60° C. at a heating rate of 2° C./minute. Reaction conditions and product properties are summarized in Table 4. The yield and amide-to-ester ratio increased as reaction temperature increased from 140° C. to 160° C. for 1 hour and reaction time increased from 0.5 hour to 1.0 hour at 160° C. The lower molecular weight for the sample prepared at 180° C. suggests that this high reaction temperature may cause degradation during copolymerization. The microstructure of the poly(amide-ester)copolymer appears to be random, based on the observation of a single glass transition temperature for each sample.

TABLE 4

| | Example No. | | | |
|---|---|---|---|---|
| | 16 | 17 | 18 | 19 |
| Reaction temp., time | 140° C., 1 h | 160° C., 0.5 h | 160° C., 1 h | 180° C., 0.5 h |
| Yield (%) | 57.8 | 61.9 | 67.4 | 61.5 |
| Ester $CH_2$: amide $CH_2$ | 1:0.88 | 1:1.07 | 1:1.27 | 1:1.18 |
| $T_m$ (peak) (° C.) | 149.2 | 148.0 | 150.6 | 146.0 |
| $T_g$ (° C.) | −25.0 | −14.0 | −6.0 | −12.0 |
| $M_n$ (g/mol) | 22,900 | 22,000 | 22,100 | 17,200 |
| $M_n/M_w$ | 1.8 | 2.1 | 1.7 | 2.0 |

EXAMPLES 20–24

Using the microwave furnace of Example 1, polyamideesters were synthesized from epsilon-caprolactone and epsilon-caprolactam using varying catalyst concentrations and ratios of caprolactone to caprolactam. All reactions used 5–10 g of total reactants and were conducted at 160° C. for 0.5 hour. Reaction conditions and results are summarized in Table 5. The yield and the amide:ester ratio increased with increasing catalyst level, and at 3% catalyst and a 1:2 molar ratio of ester: amide starting materials, the product ratio of ester:amide mirrored that of the starting materials. The molecular weight was slightly lower at the higher catalyst concentration, suggesting that the epsilon-caprolactone reactivity is greater than the epsilon-caprolactam reactivity. This reactivity difference is in agreement with the studies of Goodman; see I. Goodman and R. Vachon, *Eur. Polym. J.*, volume 20, pages 529–537 (1984).

TABLE 5

| | Example No. | | | | |
|---|---|---|---|---|---|
| | 20 | 21 | 22 | 23 | 24 |
| Catalyst conc. (mol %) | 0.5% | 1% | 2% | 3% | 3% |
| Start. mat'l ester: amide | 1:2 | 1:2 | 1:2 | 1:2 | 1:1 |
| Yield (%) | 45.7 | 61.9 | 70.1 | 78.2 | 66.7 |
| Ester $CH_2$: amide $CH_2$ | 1:0.60 | 1:1.08 | 1:1.36 | 1:2.00 | 1:0.81 |
| $T_m$ (peak) (° C.) | 128.8 | 151.5 | 154.8 | 145.4 | 142.3 |
| $T_g$ (° C.) | −27.0 | −14.0 | −7.5 | 6.0 | −22.0 |
| $M_n$ (g/mol) | 26,500 | 22,000 | 21,300 | 16,200 | 17,000 |
| $M_n/M_w$ | 2.1 | 2.1 | 2.0 | 1.5 | 1.5 |

EXAMPLES 25–30

Using the microwave furnace of Example 1, polyamideesters were synthesized from epsilon-caprolactone and epsilon-caprolactam using both conventional thermal heating and microwave heating at catalyst concentrations of 1, 2, and 3 mole percent based on total monomer. All reactions were conducted at 160° C. for 0.5 hours, and the initial molar ratio of epsilon-caprolactone to epsilon-caprolactam was 1:2. Reaction conditions and results are summarized in Table 6. These results show that higher yields and higher amide-to-ester ratios were observed in the microwave syntheses compared to the conventional thermal syntheses. The higher yield generated by microwave copolymerization suggest that microwave energy provides a more efficient synthesis method by direct interaction between microwaves and molecular dipole moments of the materials. The higher amide-to-ester ratios in the microwave synthesized copolymers suggests that microwave energy is delivered more efficiently to amide units than to ester units during copolymerization. The higher glass transition temperatures of the microwave synthesized copolymers compared to the thermally synthesized copolymer can be attributed to the microwave products' higher amide content.

TABLE 6

| | Example No. | | | | | |
|---|---|---|---|---|---|---|
| | 25 | 26 | 27 | 28 | 29 | 30 |
| Catalyst | 1% | 2% | 3% | 1% | 2% | 3% |
| Heat source | thermal | thermal | thermal | m'wave | m'wave | m'wave |
| Yield (%) | 51.2 | 52.7 | 57.0 | 61.9 | 70.1 | 78.2 |
| Ester $CH_2$:amide $CH_2$ | 1:0.61 | 1:1.19 | 1:1.29 | 1:1.08 | 1:1.36 | 1:2.00 |
| $T_g$ (° C.) | −27.0 | −18.5 | −14.5 | −14.0 | −7.5 | 6.0 |
| $M_n$ (g/mol) | 25,400 | 19.800 | 17,100 | 22,000 | 21,300 | 16,200 |
| $M_n/M_w$ | 1.4 | 1.5 | 1.6 | 2.1 | 2.0 | 1.5 |

While preferred embodiments have been shown and described, various modifications and substitutions may be made thereto without departing from the spirit and scope of the invention. Accordingly, it is to be understood that the present invention has been described by way of illustration and not limitation.

All cited patents and other references are incorporated herein by reference.

What is claimed is:

1. A polymer synthesis method, comprising:
   irradiating a reaction mixture with microwaves, wherein the microwave radiation is characterized by
      a varying frequency of about 2.4 to about 7 GHz;
      a frequency sweep rate of about 0.1 to about 10 GHz/sec;
      a forward power input of about 200 to about 10,000 Watts per total moles of reactant; and
      the forward power input of the microwave radiation is adjusted to maintain a known temperature in the composition; and further wherein
   the reaction mixture comprises aliphatic lactones having from 4 to 12 carbon atoms; aliphatic lactams having from 4 to 12 carbon atoms; amino acids having from 4 to 12 carbon atoms; omega-hydroxyacids having from 4 to 12 carbon atoms; mixtures of aliphatic dicarboxylic acids having from 4 to 12 carbon atoms and aliphatic diamines having from 2 to 12 carbon atoms; mixtures of aliphatic dicarboxylic acids having from 4 to 12 carbon atoms and aliphatic diols having from 2 to 12 carbon atoms; or mixtures of aliphatic lactones having from 4 to 12 carbon atoms and aliphatic lactams having from 4 to 12 carbon atoms.

2. The method of claim 1, wherein the composition comprises a mixture of aliphatic dicarboxylic acids having from 4 to 12 carbon atoms and aliphatic diamines having from 2 to 12 carbon atoms.

3. The method of claim 2, wherein the composition comprises adipic acid and hexamethylenediamine.

4. The method of claim 3, wherein the composition is maintained at a temperature of about 180° C. to about 210° C. for about 20 minutes to about 40 minutes.

5. The method of claim 3, wherein the composition is irradiated at about 2.4 GHz to about 7 GHz.

6. The method of claim 1, wherein the composition comprises an aliphatic lactam having from 4 to 12 carbon atoms.

7. The method of claim 6, wherein the composition comprises epsilon-caprolactam.

8. The method of claim 7, wherein the composition further comprises omega-aminocaproic acid at about 2 mole percent to about 20 mole percent based on the moles of epsilon-caprolactam.

9. The method of claim 7, wherein the composition is maintained at a temperature of about 250° C. to about 280° C. for about 1 hour to about 3 hours.

10. The method of claim 1, wherein the composition comprises an aliphatic lactone having from 4 to 12 carbon atoms.

11. The method of claim 10, wherein the composition comprises epsilon-caprolactone.

12. The method of claim 11, wherein the composition further comprises stannous octoate at about 0.05 mole percent to about 0.1 mole percent based on the moles of epsilon-caprolactone.

13. The method of claim 11, wherein the composition further comprises 1,4-butanediol at about 0.1 mole percent to about 3 mole percent based on the moles of epsilon-caprolactone.

14. The method of claim 11, wherein the composition is maintained at a temperature of about 150° C. to about 200° C. for about 1 hour to about 3 hours.

15. The method of claim 14, wherein the forward power input is about 900 W/mole to about 1500 W/mole, based on the moles of epsilon-caprolactone.

16. The method of claim 1, wherein the composition comprises an aliphatic lactone having from 4 to 12 carbon atoms and an aliphatic lactam having from 4 to 12 carbon atoms.

17. The method of claim 16, wherein the molar ratio of aliphatic lactam to aliphatic lactone is about 0.5:1 to about 4.0:1.

18. The method of claim 16, wherein the composition comprises epsilon-caprolactone and epsilon-caprolactam.

19. The method of claim 16, further comprising about 0.5 mole percent to about 4.0 mole percent of a lithium aluminum hydride catalyst having the formula $LiAl(H)_x(R^1)_y$, where $x=1-4$, $y=0-3$, $x+y=4$, and $R^1$ is selected from the group consisting of $C_1-C_{12}$ alkyl and $C_1-C_{12}$ alkoxy.

20. The method of claim 19, wherein the lithium aluminum hydride catalyst is represented by $LiAl(H)(OR^2)_3$, wherein $R^2$ is selected from the group consisting of $C_1-C_8$ alkyl.

21. The method of claim 16, wherein the forward power input is about 400 W/mole to about 1,200 W/mole, based on the total moles of epsilon-caprolactone and epsilon-caprolactam.

22. The method of claim 16, wherein the microwave frequency is varied between about 4.2 and about 5.2 GHz.

23. The method of claim 16, wherein the composition is maintained at a temperature of about 140° C. to about 180° C. for about 0.5 hour to about 2 hours.

24. The method of claim 1, wherein the composition is irradiated in a substantially oxygen-free atmosphere.

25. The method of claim 1, wherein the composition is irradiated in a microwave-transparent vessel.

26. The method of claim 1, wherein the microwave irradiation is the sole source of heat.

27. The method of claim 1, wherein the composition does not comprise solvent.

28. The method of claim 1, wherein the composition is irradiated in a mold to directly form a shaped article.

29. A method for the synthesis of nylon-6,6, comprising: irradiating with microwaves a composition comprising about 45 mole percent to about 55 mole percent adipic acid and about 45 mole percent to about 55 mole percent hexamethylenediamine, where mole percentages are based on the total composition; wherein the microwave radiation is characterized by a varying frequency of about 3 to about 6 GHz, a frequency sweep rate of about 0.5 to about 1.0 GHz/sec; and a forward power input of about 2,000 to about 3,500 Watts per total moles of adipic acid and hexamethylenediamine; and wherein the forward power input of the microwave radiation is adjusted to maintain a composition temperature of about 180° C. to about 210° C. for about 0.25 hour to about 1 hour.

30. A method for the synthesis of poly(epsilon-caprolactam), comprising: irradiating with microwaves a composition comprising about 85 mole percent to about 95 mole percent epsilon-caprolactam and about 5 mole percent to about 15 mole percent omega-aminocaproic acid, where mole percentages are based on the total composition; wherein the microwave radiation is characterized by a varying frequency of about 3 to about 6 GHz, a frequency sweep rate of about 0.5 to about 1.0 MHz/sec; and a forward power input of about 900 to about 2,800 Watts per total moles of epsilon-caprolactam and omega-aminocaproic acid; and wherein the forward power input of the microwave radiation is adjusted to maintain a composition temperature of about 250° C. to about 280° C. for about 1 to about 3 hours.

31. A method for the synthesis of poly(epsilon-caprolactone), comprising: irradiating with microwaves a composition comprising about 95 mole percent to about 99.8 mole percent epsilon-caprolactone, about 0.2 mole percent to about 2 mole percent stannous octoate, and, optionally, about 0.5 mole percent to about 2 mole percent 1,4-butanol, where mole percentages are based on the total composition; wherein the microwave radiation is characterized by a varying frequency of about 3 to about 6 GHz, a frequency sweep rate of about 0.5 to about 1.0 MHz/sec; and a forward power input of about 900 to about 1500 Watts per mole of epsilon-caprolactone; and wherein the forward power input of the microwave radiation is adjusted to maintain a composition temperature of about 150° C. to about 200° C. for about 1 to about 3 hours.

32. A method for the synthesis of poly(caprolactone-co-caprolactam), comprising: irradiating with microwaves a composition comprising about 30 mole percent to about 50 mole percent epsilon-caprolactone, about 50 mole percent to about 70 mole percent epsilon-caprolactam, and about 0.5 mole percent to about 2 mole percent of the $LiAl(H)(OC(CH_3)_3)_3$, where mole percentages are based on the total moles of epsilon-caprolactone and epsilon-caprolactam; wherein the microwave radiation is characterized by a varying frequency of about 3 to about 6 GHz, a frequency sweep rate of about 0.5 to about 1.0 MHz/sec; and a forward power input of about 400 to about 1,200 Watts per total moles of epsilon-caprolactone and epsilon-caprolactam; and wherein the forward power input of the microwave radiation is adjusted to maintain a composition temperature of about 140° C. to about 180° C. for about 0.3 to about 2 hours.

* * * * *